United States Patent
Braunecker et al.

(12)

(10) Patent No.: US 8,241,381 B2
(45) Date of Patent: Aug. 14, 2012

(54) AIR FILTER WITH INTEGRAL INTER-FILTER GAP FILLER

(75) Inventors: Laura Braunecker, Cumming, GA (US); Alice Gordon, Roswell, GA (US); Ward Elwood, Jr., Roswell, GA (US); Timothy J. Peters, Neenah, WI (US); Anthony N. Fedel, Alpharetta, GA (US); George I. Nukuto, Neenah, WI (US); David M. Matela, Alpharetta, GA (US); Kevin P. McGrath, Alpharetta, GA (US); Alan E. Wright, Woodstock, GA (US); Bernard J. Bangert, Appleton, WI (US); Wanda Jackson, Woodstock, GA (US); Robert Alan Drew, Atlanta, GA (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 349 days.

(21) Appl. No.: 12/215,509

(22) Filed: Jun. 27, 2008

(65) Prior Publication Data

US 2009/0320422 A1    Dec. 31, 2009

(51) Int. Cl.
*B01D 46/00*    (2006.01)
(52) U.S. Cl. ................ 55/483; 55/484; 55/502; 55/511; 55/DIG. 31
(58) Field of Classification Search .................... 55/482, 55/483, 484, 502, DIG. 31
See application file for complete search history.

(56) References Cited

U.S. PATENT DOCUMENTS

| | | | |
|---|---|---|---|
| 2,019,213 A | 10/1935 | Dahlman | |
| 2,252,724 A | 8/1941 | Myers | |
| 3,423,908 A | 1/1969 | Hart | |
| 3,862,903 A | 1/1975 | Getzin | |
| 3,884,662 A | 5/1975 | Hladik | |
| 4,009,012 A * | 2/1977 | Heffler | 55/483 |
| 4,128,251 A | 12/1978 | Gaither et al. | |
| 4,233,044 A * | 11/1980 | Allan | 55/355 |
| 4,584,005 A | 4/1986 | Allan et al. | |
| 4,639,261 A * | 1/1987 | Pittman et al. | 55/502 |
| 4,854,953 A | 8/1989 | VanWeerden et al. | |
| 4,925,468 A * | 5/1990 | Kishi et al. | 55/467 |
| 5,059,218 A | 10/1991 | Pick | |
| 5,240,487 A | 8/1993 | Kung | |
| 5,298,044 A | 3/1994 | Sutton et al. | |
| 5,332,409 A | 7/1994 | Dralle | |
| 5,525,136 A | 6/1996 | Rosen | |
| 5,618,324 A | 4/1997 | Sommer et al. | |
| 5,795,361 A | 8/1998 | Lanier, Jr. et al. | |
| 5,797,975 A | 8/1998 | Davis | |
| 5,837,022 A | 11/1998 | Chapman | |
| 5,858,515 A | 1/1999 | Stokes et al. | |

(Continued)

FOREIGN PATENT DOCUMENTS

EP    1504803 A1    2/2005

(Continued)

*Primary Examiner* — Robert Clemente
(74) *Attorney, Agent, or Firm* — Dority & Manning, P.A.

(57) ABSTRACT

A disposable air filter that includes: (a) air filtration media; (b) a substantially planar air filter frame providing three-dimensional support for the air filtration media; and (c) an inter-filter gap filler disposed along substantially the entire length of at least one side of an opposed pair of the first or second sides and integrated into the air filter frame is disclosed. The integral inter-filter gap filler reduces gaps between adjacent air filters disposed in a filter track of an air filter bank.

16 Claims, 14 Drawing Sheets

U.S. PATENT DOCUMENTS

| | | | |
|---|---|---|---|
| 5,931,988 A | 8/1999 | LeBlanc et al. | |
| 5,993,520 A | 11/1999 | Yu | |
| 6,007,596 A | 12/1999 | Rosen | |
| 6,027,553 A | 2/2000 | Hirano et al. | |
| 6,099,612 A | 8/2000 | Bartos | |
| 6,149,701 A | 11/2000 | Ellingson | |
| 6,174,340 B1 | 1/2001 | Hodge | |
| 6,241,603 B1 | 6/2001 | Watson | |
| 6,267,793 B1 | 7/2001 | Gomez et al. | |
| 6,274,041 B1 | 8/2001 | Williamson et al. | |
| 6,322,604 B1 | 11/2001 | Midkiff | |
| 6,361,578 B1 | 3/2002 | Rubinson | |
| 6,425,945 B1 | 7/2002 | Cheng | |
| 6,451,079 B1 | 9/2002 | Lange et al. | |
| 6,485,538 B1 | 11/2002 | Toyoshima | |
| 6,508,851 B2 | 1/2003 | Goerg | |
| 6,579,336 B1 | 6/2003 | Duffy et al. | |
| 6,624,100 B1 | 9/2003 | Pike | |
| 6,716,267 B2 | 4/2004 | Lawlor, Sr. | |
| 6,780,217 B1 | 8/2004 | Palmer | |
| 6,793,715 B1 | 9/2004 | Sandberg | |
| 6,815,383 B1 | 11/2004 | Arnold | |
| 6,916,352 B2 | 7/2005 | Sutton et al. | |
| 6,941,630 B2 | 9/2005 | Wynn | |
| 7,041,147 B2 | 5/2006 | Huehn et al. | |
| 7,128,771 B2 | 10/2006 | Harden | |
| 7,261,757 B2 | 8/2007 | Duffy | |
| 7,320,720 B2 * | 1/2008 | Ticknor | 55/483 |
| 7,410,520 B2 * | 8/2008 | Nowak et al. | 55/482 |
| 7,419,524 B2 * | 9/2008 | Caesar et al. | 55/482 |
| 2003/0096548 A1 | 5/2003 | Groitzsch et al. | |
| 2003/0230063 A1 | 12/2003 | Kubokawa et al. | |
| 2003/0233818 A1 | 12/2003 | Hensley | |
| 2004/0035767 A1 | 2/2004 | Pahl et al. | |
| 2004/0074215 A1 | 4/2004 | Cocconi | |
| 2004/0182055 A1 | 9/2004 | Wynn | |
| 2005/0039427 A1 | 2/2005 | Karlsson | |
| 2006/0096261 A1 | 5/2006 | Zhang | |
| 2006/0168926 A1 | 8/2006 | Dawson et al. | |
| 2006/0277879 A1 | 12/2006 | Knowles | |
| 2007/0084167 A1 | 4/2007 | Ticknor | |
| 2008/0105126 A1 * | 5/2008 | Kawano et al. | 96/11 |
| 2008/0148698 A1 | 6/2008 | Nowak et al. | |

FOREIGN PATENT DOCUMENTS

| | | |
|---|---|---|
| EP | 1527806 A1 | 5/2005 |
| GB | 1070149 A | 5/1967 |
| GB | 1115422 A | 5/1968 |
| GB | 1490019 A | 10/1977 |
| JP | 57-070416 U | 4/1982 |
| JP | 59-086227 U | 6/1984 |
| JP | 61-183116 U | 11/1986 |
| JP | 05-026127 U | 4/1993 |
| JP | 7-31817 A | 2/1995 |
| JP | 11-047526 A | 2/1999 |
| JP | 11-304235 A | 11/1999 |
| JP | 2005-177641 A | 7/2005 |
| JP | 2008-119683 A | 5/2008 |
| WO | WO 2006/052094 | 5/2006 |

* cited by examiner

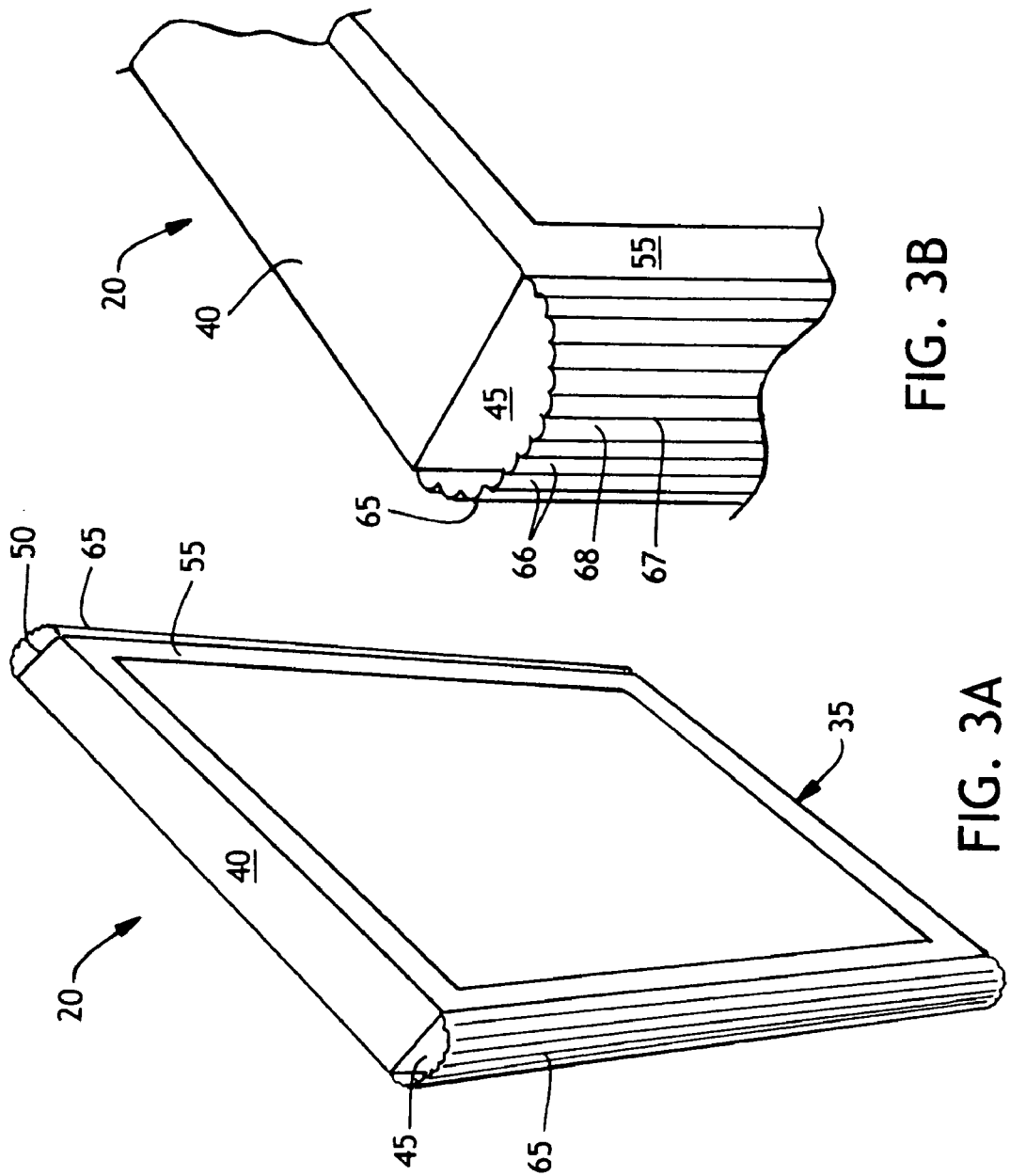

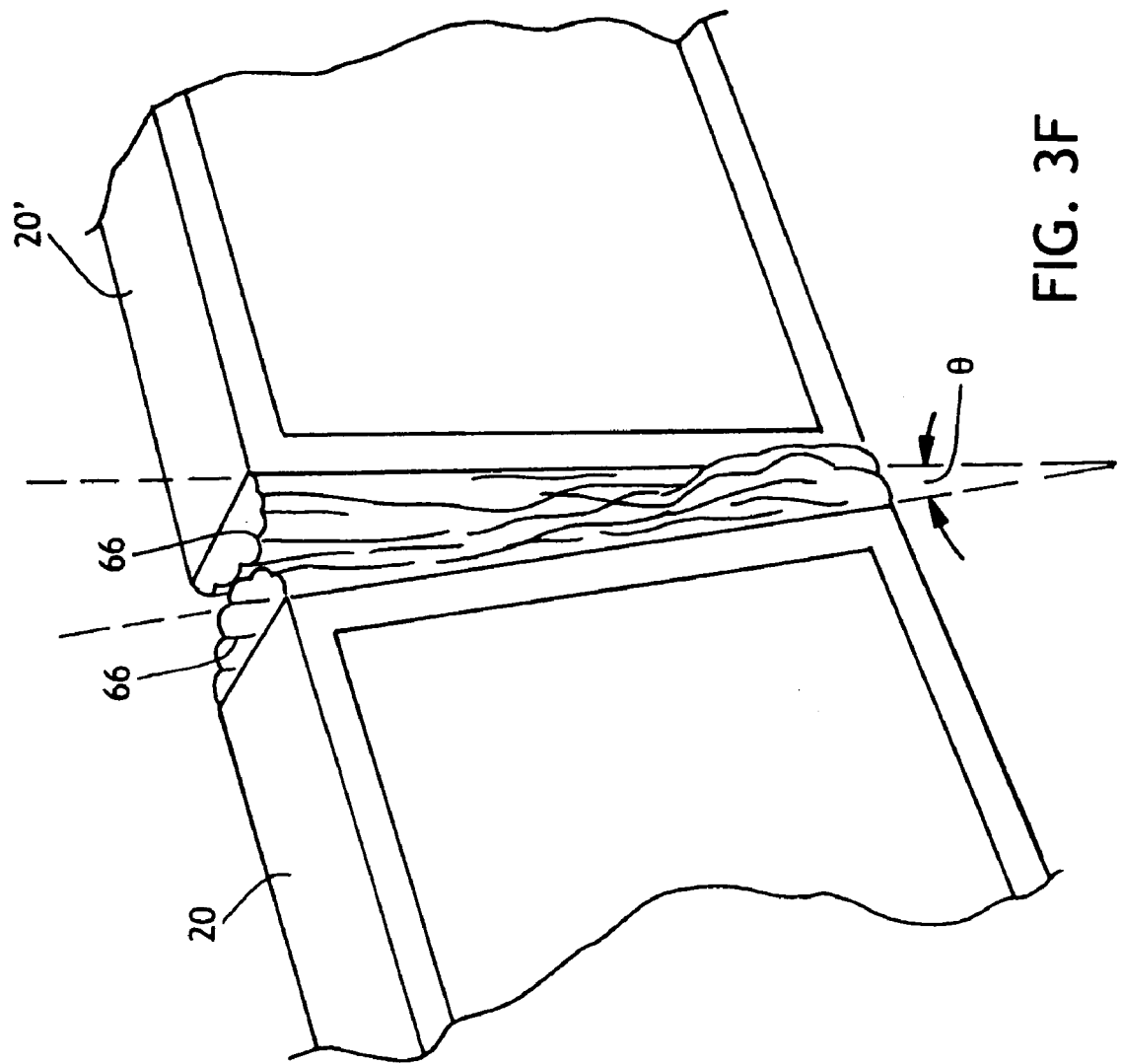

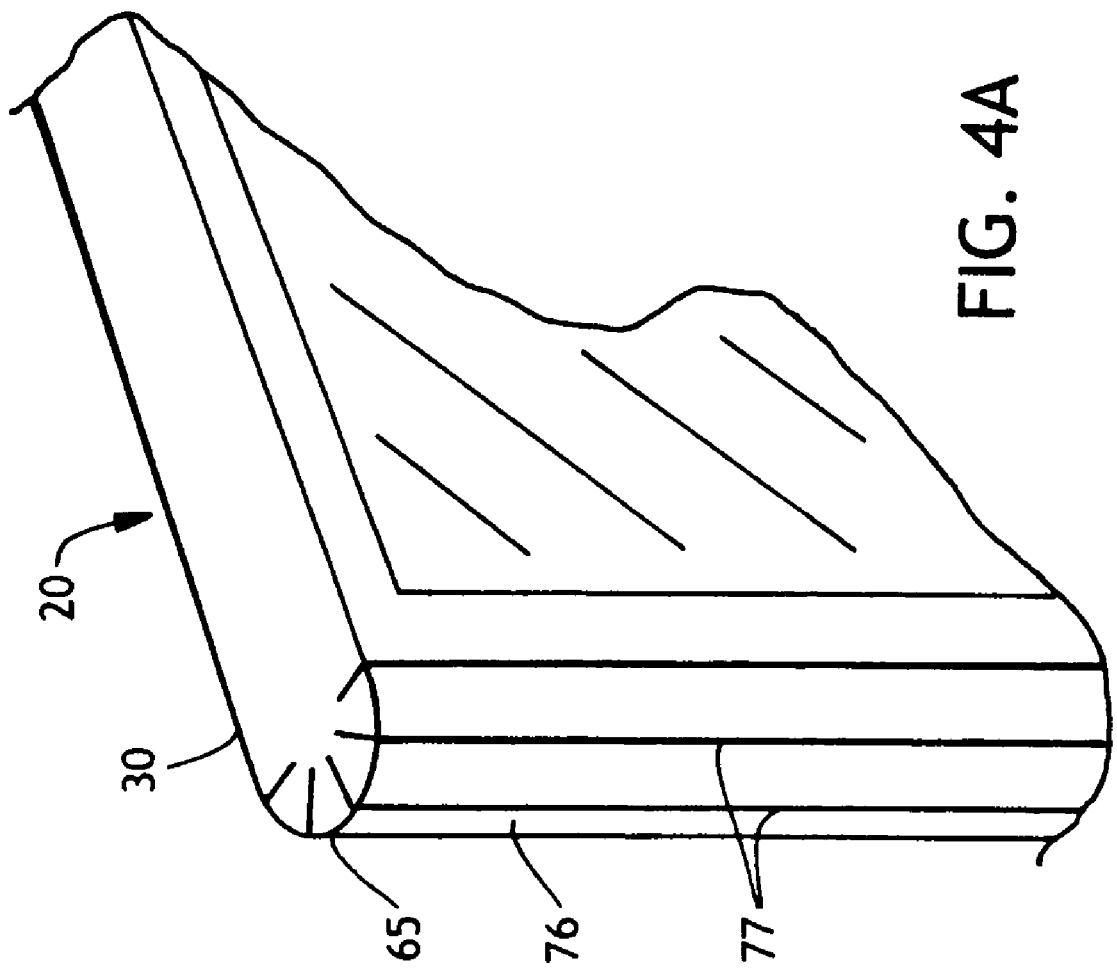

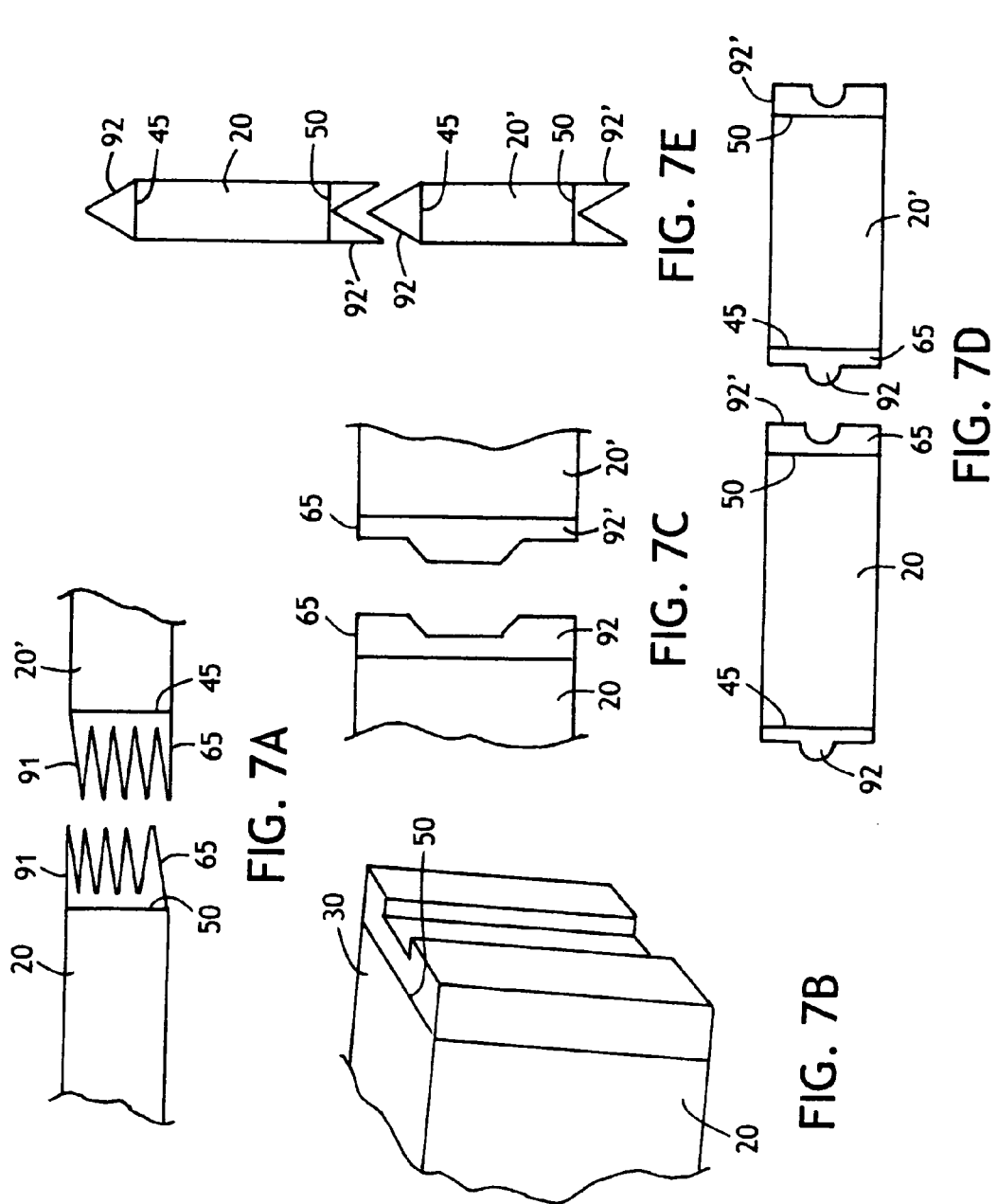

AIR FILTER WITH INTEGRAL INTER-FILTER GAP FILLER

FIELD OF THE INVENTION

The present invention relates in general to air filters. In particular, the invention relates to air filters used in applications where multiple adjacent air filters are arranged in a filter bank or array.

BACKGROUND OF THE INVENTION

Air filters are generally known in the art and are employed in a variety of applications including heating and ventilation systems. A typical air filter is composed of a filtering material; often paper, a nonwoven material or foam, and a frame or housing that supports the filtering material. Conventional air filters are typically designed to remove particulate matter from the air.

In some applications, particularly those related to commercial and industrial operations, the ventilation ducts may be quite large. Typically, several air filters are used in a filter bank. These filters may be installed into individual cells of an array or frame for holding individual filters or may slide into a rack that is adapted to hold a row of air filters in a side-by-side arrangement. Thus, an array of air filters arranged adjacent to one another is typically employed as a filter bank.

In some applications, particularly where air filters are installed in individual cells of an array, each air filter may be mounted in the cell using a separate mounting gasket or seal to reduce or eliminate air bypass. These gaskets or seals are typically connected or attached to the frame or periphery of an individual cell in an array and are not replaced when each air filter is replaced. The replacement of an air filter in these cells is a labor intensive and time-consuming task, since each gasket or seal creates a tight fit around the filter, the air filter needs to be removed from each individual cell and replaced with a new air filter, ensuring each individual filter is appropriately seated in the gasket or seal, among other tasks.

In other applications, several air filters are installed by sliding the air filters into a track that is adapted to hold a row of air filters in a filter bank. Problems encountered during installation include, for example, difficulty in moving the air filters along the track, aligning the many air filters together, slight distortion of the filter frame during manufacture or during installation, distortions in the filter track, accumulated debris or dust in the filter track that can be scraped up as the air filter is moved along the track, and the like. This difficulty may increase with the larger air handling systems having multiple large rows of filters in a filter bank. As a result, the conventional side-by-side arrangement of air filters in a filter bank often results in a small gap or space between adjacent air filters which may permit a portion of air flow to avoid being filtered by the air filter bank prior to being circulated throughout a building.

Moreover, the conventional side-by-side arrangement of air filters in a filter bank often results in a small gap or space between adjacent filters. As a result, a portion of air flow may avoid being filtered by the filter bank, bypassing the air filters (known as air bypass), prior to being circulated throughout the building. This may result in detrimental effects of unfiltered air flowing through a ventilation system, including adverse effects on individuals. In addition to these effects on individuals, unfiltered air flow may also induce mechanical problems within the ventilation system itself, which may result in improper heating and cooling operations within a building structure. Dust particles may be deposited on the heating and cooling coils, clogging the coils and impeding proper operation of the ventilation system. Cleaning such coils is both time consuming and expensive.

One solution to the problem of air bypass is described in U.S. Pat. No. 6,916,352 to Sutton et al. and relates to the use of "I" shaped connectors to join adjacent filters in a filter bank. The connectors are used to join individual filters in side-by-side relationship as they are inserted into a track or opening in a filter bank. Sides of adjoining filter panels are inserted into the opposed channels of the "I"-shaped connectors. The "I"-shaped connector fills the gap between the sides of the adjacent filters to reduce air bypass between the sides of adjacent filters. The disadvantage with this design is the need for a separate, non-integral connector pieces that must be joined to each filter upon installation.

Because the connector piece is inserted separately from the air filter, such an air filter installation process would disadvantageously be more time-consuming and cumbersome than that of installing filters alone. There is also the risk that an installer may inadvertently drop a connector piece into the filter bank and be forced to extract and reposition it, prolonging the installation process. In addition, installation may be dependent upon having an adequate supply of both connector pieces and air filters on site, possibly requiring installers to transport an increased volume of materials and supplies to installation sites.

Another solution to the problem of air bypass is described in US 2007/0084167 A1, which teaches using connectors with overlapping flaps. While these connectors are described as reducing air bypass, the connectors require the overlapping of flaps which can cause problems associated with proper alignment and positioning of the air filters in the filter bank or array.

Therefore, it is readily apparent that there is a need for an air filter that addresses these problems.

BRIEF SUMMARY OF THE INVENTION

The problems described above are addressed by the present invention which encompasses a disposable air filter having: a) air filtration media; b) a substantially planar air filter frame providing three-dimensional support for the air filtration media, the air filter frame has an opposed pair of first sides, an opposed pair of second sides, two opposed faces, and a width between the opposed faces; and c) an integral inter-filter gap filler disposed along substantially the entire length of at least one side of an opposed pair of the first or second sides such that the integral inter-filter gap filler reduces gaps between adjacent air filters when the filters are installed in a filter track of a filter bank.

According to the invention, the integral inter-filter gap filler may be, for example, a collapsible convex element; flexible overlapping curved elements; nesting elements, a lap joint; an air-pressure responsive expandable element; or a combination thereof.

Generally speaking, the collapsible convex elements may be formed from a corrugated material. Typically, the alternating parallel grooves and ridges of the corrugations extend parallel to the side of the air filter frame on which the integral gap filler is disposed.

In an aspect of the invention, the collapsible convex elements; flexible overlapping curved elements; nesting elements, or lap joints may be formed from the same material as the air filter frame. Alternatively, the collapsible convex elements; flexible overlapping curved elements; nesting elements, or lap joints may be formed from a material that is different from the material used to form the air filter frame.

For example, if the air filter frame was formed of a paper or cardboard, the flexible overlapping curved elements; nesting elements, lap joints; or modified lap joints may be formed from a foam material or any other material which will effectively fill the gaps between filters positioned in a filter track of a filter bank.

The air filtration media may be conventional air filtration material including paper, nonwoven fabrics, fiberglass and foams. Although paper filters and mixed media filter materials are frequently used, one desirable air filtration media is a non-woven fibrous material or laminate material.

Generally, the integral inter-filter gap filler may be disposed along substantially the entire length of both sides of an opposed pair of the first or second sides of the air filter frame. In addition, the integral inter-filter gap filler may be located on all sides of the air filter frame.

The present invention also encompasses an air filter system having at least two disposable air filters, (i.e., a plurality of disposable air filters) as generally described above. More particular, the air filter system utilizes a plurality of the air filter frames having an integral inter-filter gap filler disposed along substantially the entire length of at least one side of an opposed pair of the first or second sides of each air filter frame so that integral inter-filter gap filler reduces gaps between adjacent air filters. According to an aspect of the air filter system, the integral inter-filter gap fillers may be adapted to connect adjacent air filters with sufficient structural strength in at least one direction so that the connection resists separation upon extraction of a plurality of connected air filters from the filter track of a filter bank.

The present invention further encompasses a method of installing disposable air-filters in a track of a filter bank of an air handling system utilizing the air filter system described above. The method includes at least the following steps: a) providing a first disposable air filter having an integral inter-filter gap filler; b) providing at least a second disposable air filter having an integral inter-filter gap filler; and c) inserting the first air filter in the track of a filter bank and then inserting at least a second air filter in the track of a filter bank and pushing the at least second air filter against the first or adjacent air filter so that the integral inter-filter gap filler reduces gaps between adjacent filters during air flow across the air filters.

In a further embodiment of the method of the present invention, additional filters with the integral inter-filter gap filler may be installed in the track of the filter bank of an air handling system. In this additional embodiment, the third or additional filters are inserted into the track of a filter bank after the at least second filter is inserted in the track of the filter bank. The third or additional filters are pushed against the second or adjacent air filter so that the integral inter-filter gap filler reduces gaps between adjacent filters during air flow across the air filters.

These and other features and advantages of the invention will become more apparent to one skilled in the art from the following description and claims when read in light of the accompanying drawings.

BRIEF DESCRIPTION OF THE DRAWINGS

The present invention will be better understood by reading the Detailed Description of the Invention with reference to the accompanying drawing figures, in which like reference numerals denote similar structure and refer to like elements throughout, and in which:

FIGS. 3A through 3F are illustrations of exemplary integral inter-filter gap fillers in the form of collapsible convex elements;

FIGS. 4A and 4B are illustrations of an exemplary alternative embodiment of collapsible convex elements;

FIG. 7A through 7E are illustrations of exemplary integral inter-filter gap fillers in the form of nesting elements;

DEFINITIONS

Figure 1:
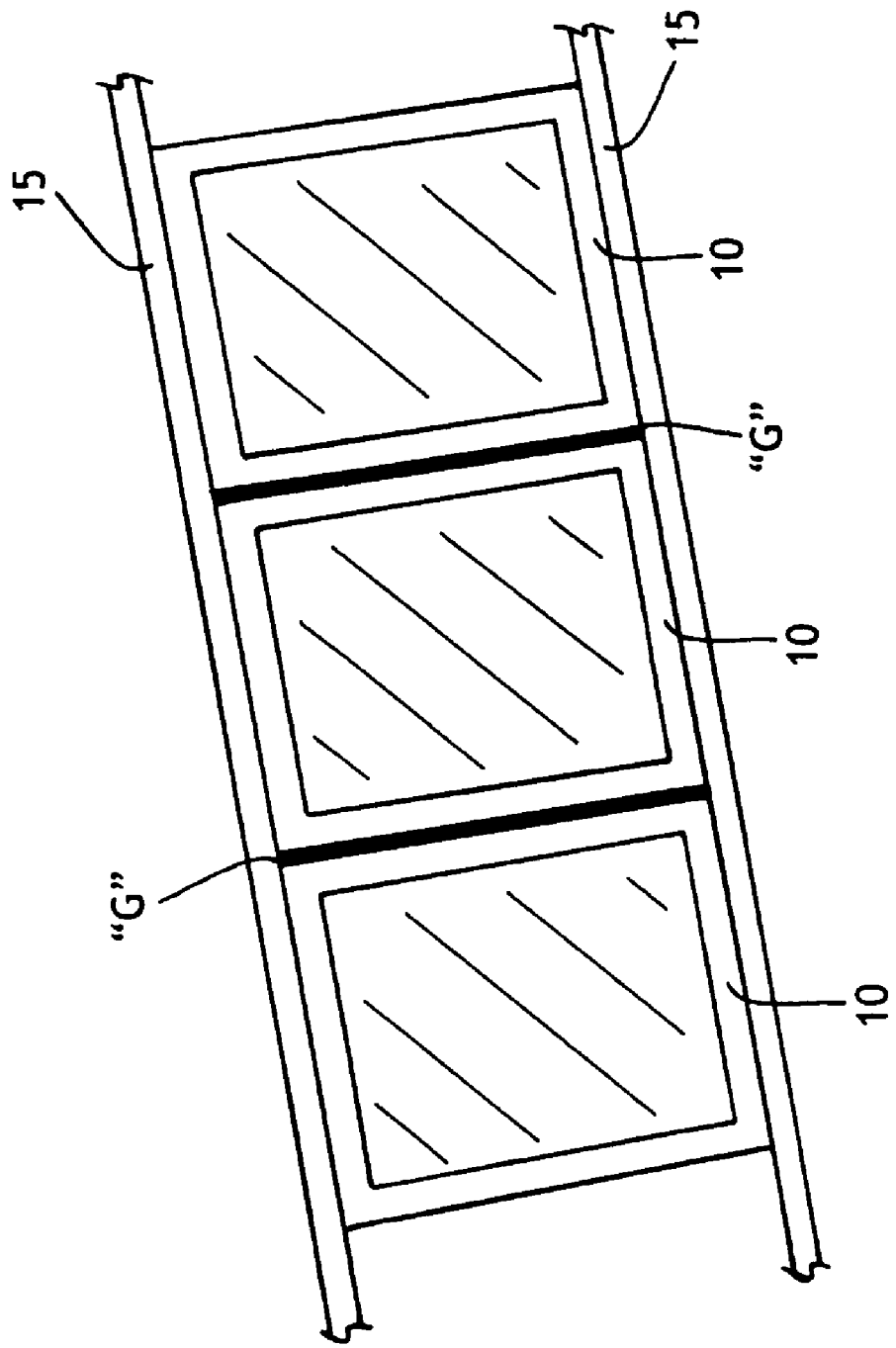
FIG. 1 is an illustration of an exemplary array or collection of conventional air filters without the integral inter-filter gap filler.

It should be noted that, when employed in the present disclosure, the terms "comprises", "comprising" and other derivatives from the root term "comprise" are intended to be open-ended terms that specify the presence of any stated features, elements, integers, steps, or components, and are not intended to preclude the presence or addition of one or more other features, elements, integers, steps, components, or groups thereof.

It should be understood that the terms "left", "right", "top", "bottom", "front" and "back" are all intended to be relative terms and are for reference in the drawings only. These terms are used for the purposes of understanding the present invention and are not intended by be limiting in any way.

DETAILED DESCRIPTION OF INVENTION

In describing the preferred and alternate embodiments of the present invention, as illustrated in the figures and/or described herein, specific terminology is employed for the sake of clarity. The invention, however, is not intended to be limited to the specific terminology so selected, and it is to be understood that each specific element includes all technical equivalents that operate in a similar manner to accomplish similar functions. Thus, exemplary embodiments of the invention are presented herein; however, the invention may be embodied in a variety of alternative forms, as will be apparent to those skilled in the art. To facilitate understanding of the invention, and provide a basis for the claims, various figures are included in the description. The figures are not drawn to scale and related elements may be omitted so as to emphasize the novel features of the invention. Structural and functional details depicted in the figures are provided for the purpose of teaching the practice of the invention to those skilled in the art and are not intended to be considered limitations. Directional terms such as left, right, front or rear are provided to assist in the understanding of the invention and are not intended to be considered as limitations.

Referring now to FIG. 1, there is illustrated an exemplary array or collection of conventional air filters 10 arranged in a row or adjacent or side-by-side configuration in a conventional filter track 15 of a typical filter bank. The filter track 15 serves to hold a row of filters in a filter bank. Conventional air filters may encounter problems during installation including, for example, difficulty in moving the plurality of air filters along the track, aligning the plurality of air filters together, slight distortion of the filter frame during installation, distortions in the filter track, accumulated debris or dust in the filter track that can be scraped up as the air filter is moved along the track, and the like. These problems may generally increase with the larger air handling systems having multiple large rows of filters in a filter bank. Another problem is that gaps "G" between the air filters 10 may result if the plurality if filters in the filter track cannot be properly aligned. Gaps will undesirably permit unfiltered air to bypass the air filters, thereby greatly reducing the efficiency of the filter bank in filtering air.

Figure 2:
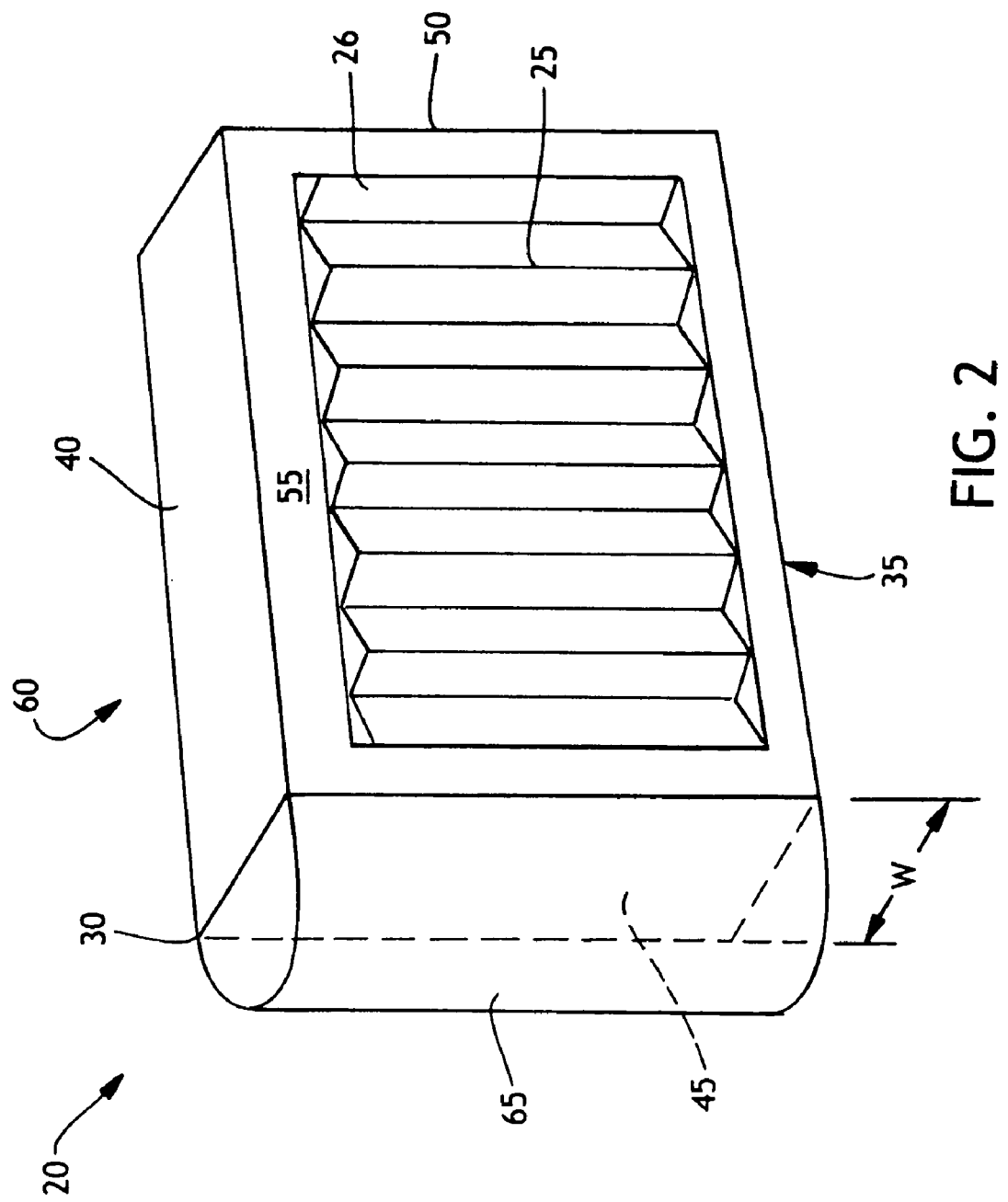
FIG. 2 is an illustration of an exemplary disposable air filter including an integral inter-filter gap filler.

The present invention encompasses a disposable air filter 20 as generally illustrated in FIG. 2 that address the problem of gaps between air filters. The disposable air filter 20 includes air filtration media 25 and a substantially planar air filter frame 30. The air filter frame 30 has an opposed pair of first sides 35 and 40, an opposed pair of second sides 45 and 50, two opposed faces 55 and 60, and a width "W" between the opposed faces. Generally speaking, the two opposed faces 55 and 60 are the front and back faces, respectively, the opposed second sides 45 and 50 are the left and right sides, respectively and the first opposed sides 35 and 40 are bottom and top, respectively, of air filter frame. The air filter frame serves to provide three-dimensional support to the air filtration media 25, the air filtration media is generally located between the front face 55 and back face 60 of the air filter frame 30. As shown, the front and back faces 55, 60 of the air filter frame 30 each have an opening 26 so that air coming into contact with the air filter 20 is allowed to pass through the front face 55, contact the air filtration media 25, pass through the filtration media 25 and the resulting filtered air is then passed through the opening in the back face. It is noted that the reference of the front face 55 and the back face are only relative terms and this description is not intended to exclude having unfiltered air passing through the back face and the filtered air being passed through the front face.

The air filter frame 30 further includes integral inter-filter gap filler 65 disposed along substantially the entire length of at least one side of an opposed pair of the first or second sides. As is shown in FIG. 2, the left side 45 of the filter frame 30 has the integral inter-filter gap filler 65; however, the integral inter-filter gap filler 65 could be located on one of the other sided 50, 35 or 40. Alternatively, the gap filler 65 may be located on one or more of the other sides 50, 35 and 40, in addition to the left side 45. In another alternative, the top and bottom sides 35, 40 may have the gap filler 65 disposed thereon.

According to the invention, the integral inter-filter gap filler 65 may be one or more of the following a collapsible convex element; flexible overlapping curved elements; nesting elements, a lap joint; an air-pressure responsive expandable element; or a combination thereof. A more detailed description of each of these gap fillers will be provided below.

Figure 3C:
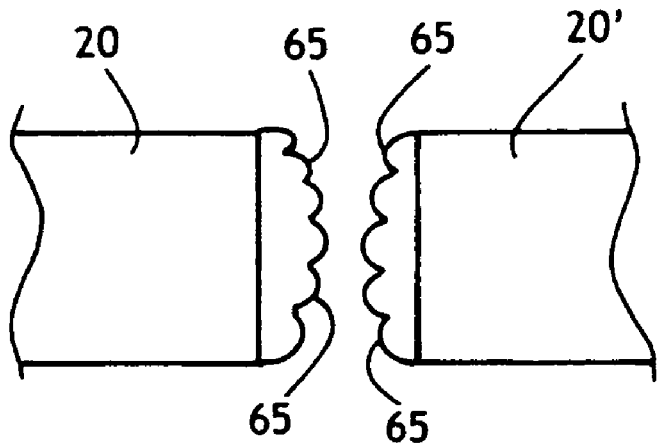

The gap filler 65 may be a convex element as is generally shown in FIGS. 3A through 3F and FIGS. 4A and 4B and FIGS. 5A and 5B. Generally speaking, FIG. 3A illustrates a disposable air filter having collapsible convex elements 66 in the form of corrugated semi-circles. The collapsible convex elements may be made of a single sheet of thin paper, plastic or similar material attached one or both opposed sides of the air filter frame. As shown in FIG. 3A, both the left and right sides 45 and 50 have the integral gap filler 65. FIG. 3B is an illustration of a section of the disposable air filter 20 showing the single sheet of thin corrugated material as the integral gap filler 65. As shown, the corrugated gap filler 65 has alternating parallel grooves 67 and ridges 68 of the corrugations extend parallel to the side 45 of the air filter frame 20 on which the integral gap filler is disposed. The parallel grooves 67 and ridges 68 allow the corrugated integral gap filler 65 to collapse when the integral inter filter gap filler 65 is brought into contact and forced against an adjacent air filter, an integral inter filter gap filler of an adjacent filter, or the filter bank in which the disposable air filter is installed.

Figure 3D:
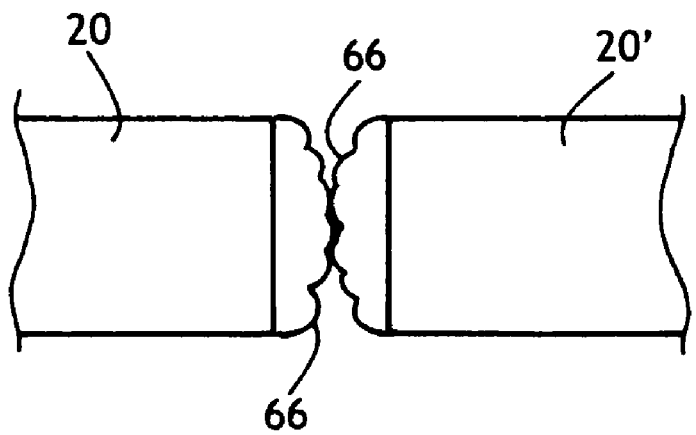
Figure 3E:
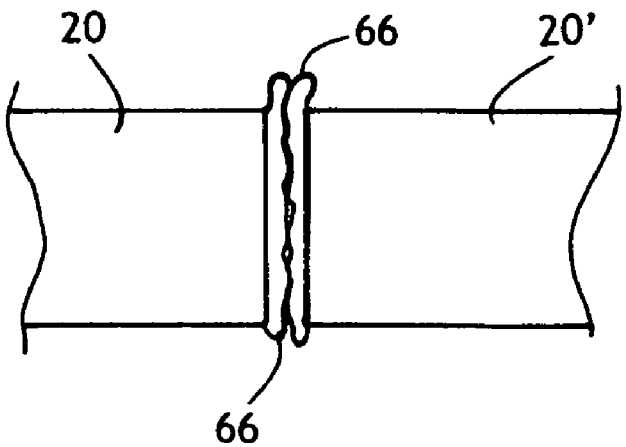

FIG. 3C is an illustration of two disposable air filters 20, 20' each having an integral inter filter gap fill 65 in the form of collapsible convex elements 66 prior to being brought together. FIG. 3D is an illustration of two disposable air filters 20, 20' having collapsible convex elements 66 as the convex elements 66 are initially brought together. FIG. 3E is an illustration of two disposable air filters 20, 20' having collapsible convex elements 66 showing the collapsible convex elements 66 in a substantially collapsed state after the disposable air filters 20, 20' have been brought together. Generally speaking, the amount of collapse is related to the amount of force applied in bringing the two disposable air filters together. It is noted a similar collapse occurs when the collapsible convex elements are brought into another filter without the integral inter-filter gap filler or the side wall of an air filter bank. One advantage of the collapsible convex elements is in situations where the disposable air filters 20, 20' are not aligned to be parallel, such as illustrated in FIG. 3F where the sides of adjacent filters are displaced by an angle "θ", some portions of the convex elements 66 will collapse more than others as generally shown.

FIG. 4A and FIG. 4B are illustrations of an exemplary embodiment of a disposable air filter 20 having a collapsible convex element 66 formed in a bull-nose or rounded end 76 of the air filter frame 30. In this embodiment, the collapsible convex element 66 is created by forming slits 77 beginning in the tp region of the bull-nose or rounded end 76 as generally shown in the top view of FIG. 4B. The slits 77 extending longitudinally along the bull-nose or rounded end 76 as generally shown in perspective view in FIG. 4A. Instead of corrugations that allow the convex element to flex and flatten, the unitary convex shaped material, which may be thin cardboard, paper or plastic, has slits 77 provide therein to provide flexibility so the material may collapse as it is pushed against an adjacent filter, an integral inter-filter gap filler of an adjacent filter or the wall of a filter bank. Alternatively and/or additionally, it is contemplated that perforations, thinned regions or score lines may be used may be used in place of the slits or in addition to the slits. Such features may be designed to be frangible upon the application of a specified level of force to resist collapse during shipping and handling, but to collapse during installation when an appropriate level of force is applied as the disposable air filters are brought into contact with one another or a wall of the air filter bank.

Figure 5:
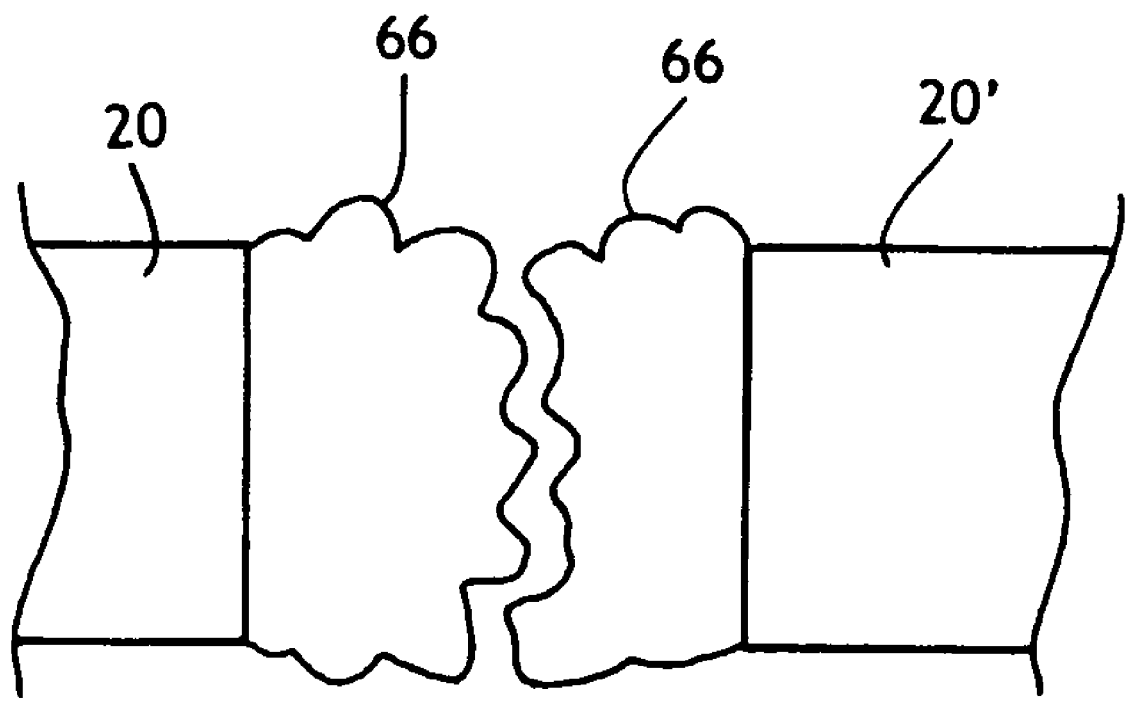
FIG. 5 is an illustration of exemplary collapsible convex elements showing corrugations.

Another feature of the collapsible convex element 66 in shown in FIG. 5, which show intermeshing of the corrugations 66. FIG. 5 is a top view showing the intermeshing of the corrugations 66 on adjacent filters 20, 20' as they are collapsed. This intermeshing helps avoid air bypass between the air filters 20, 20'.

Figure 6A:
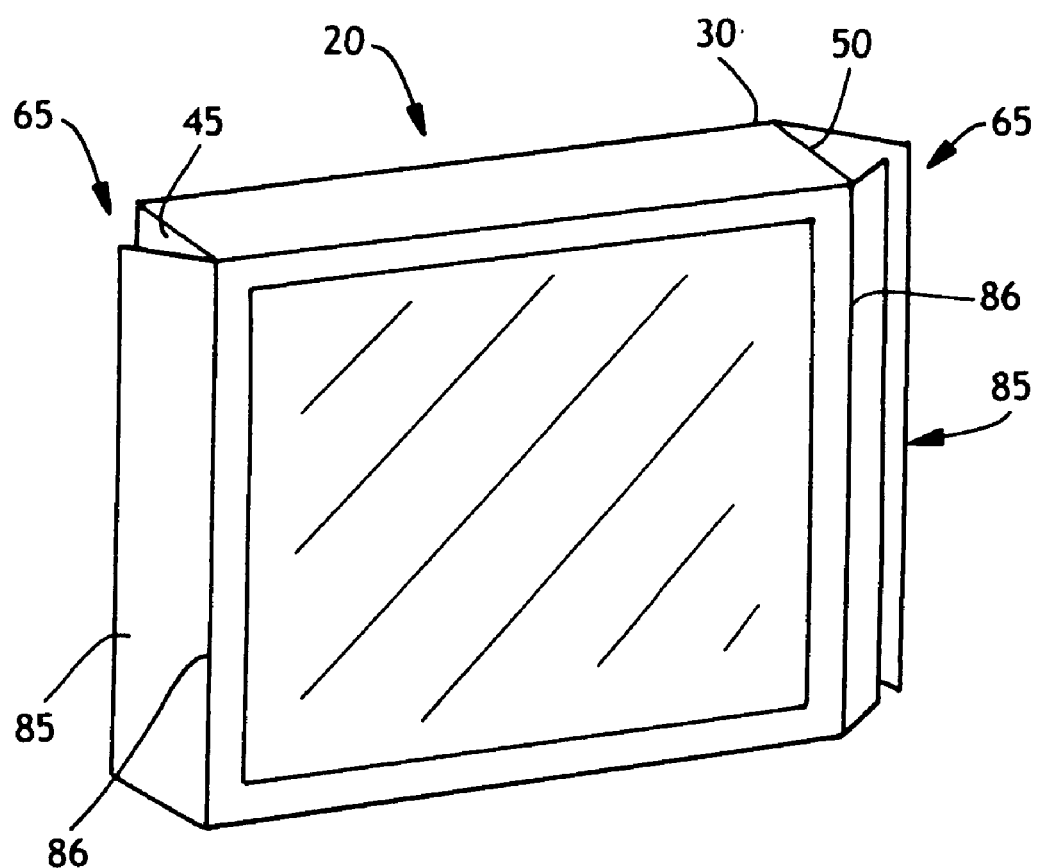
FIGS. 6A through 6C are illustrations of exemplary integral inter-filter gap fillers in the form of flexible overlapping elements.
Figure 6B:
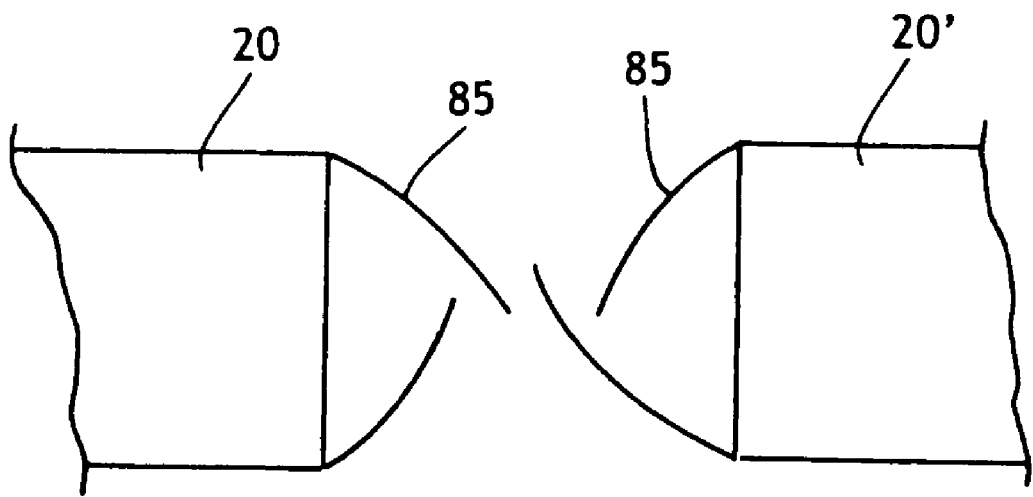
Figure 6C:
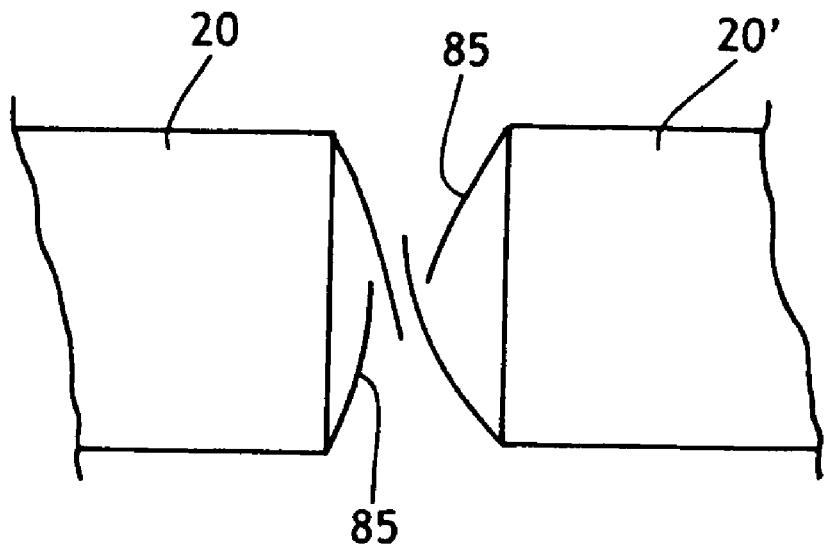

In another embodiment of the present invention, the gap filler 65 may be flexible overlapping curved elements 85 which overlap one another. Generally, one or more of the opposed side surface 45 or 50 has one or more (e.g., a plurality) of flexible overlapping curved elements 85 as generally shown in FIGS. 6A through 6C. Generally speaking, FIG. 6A illustrates a disposable air filter 20 having overlapping curved elements 85 on opposed ends 45, 50 of the air filter frame 30. The flexible curved elements 85 may be prepared from a single sheet of paper, plastic or similar material attached to each corner 86 between adjoining one of the side surfaces 45, 50 and the front face 55 or the back face 60 of the air filter frame 30. The flexible curved elements 85 are generally biased in the uncompressed position as shown in FIG. 6A.

Generally speaking, the overlapping curved elements 85 are able to collapse or flatten in a manner similar to collapsible convex elements as is illustrated in FIGS. 3C, 3D and 3E. FIG. 6B is an illustration of a top view of the disposable air filter showing the overlapping curved elements 85 prior to a force being applied upon contact with an end of an adjacent air filter. In the regard, FIG. 6B is an illustration of two disposable air filters 20, 20' each having an integral inter filter gap fill 65 in the form of overlapping curved elements 85 prior to being brought together. FIG. 6C is a illustration of a top view of the disposable air filter showing the overlapping curved elements after a force is applied upon contact with an end of an adjacent air filter to displace the overlapping curved elements. As shown in FIG. 6C, two disposable air filters 20, 20' having overlapping curved elements 85 showing the overlapping curved elements 85 in a substantially collapsed state after the disposable air filters 20, 20' have been brought together. Typically, the amount of collapse is related to the amount of force applied in bringing the two disposable air filters together. It is noted a similar collapse occurs when the overlapping curved elements 85 are brought into another filter without the integral inter-filter gap filler or the side wall of an air filter bank.

Moreover, the overlapping curved elements 85 are contemplated as collapsing or flattening in a manner similar to that illustrated in FIG. 3F in situations where the disposable air filters are not aligned to be parallel so that the sides of adjacent filters are displaced by an angle "θ", such that portions of the overlapping curved elements will collapse or flatten more than others.

The gap filler 65 may be nesting elements as is generally shown in FIGS. 7A through 7E. Generally, nesting elements are elements which fit into one another. One of the nesting elements has a first shape or configuration and the second nesting element has a complementary shape adapted to fit into the first shape. One example of nesting elements are elements which have a male component and a complementary female component. Male and female elements are shown in FIGS. 7C, 7D and 7E.

FIG. 7A is a top view of two ends of two separate disposable air filters 20, 20' having a substantially identical saw-tooth profile or a series of sharp folds 91 that allows one end 50 of one air filter 20 to nest or fit in the other end 45 of the adjacent filter 20'. The saw-tooth or sharp folds 91 may be formed by folding a material such as, for example, paper, thin cardboard or plastic, or may be generated by cutting a flexible material such as a foam material.

FIG. 7B is a perspective view of a gap filler 65 in the form of a nesting element that may be formed directly into the air filter frame 30 or may be applied to the air filter frame 40. FIG. 7C is an illustration of a top view of two ends of two separate disposable air filters 20, 20' which have matched or complementary nesting elements 92, 92', respectively, that allow one end of one filter 20 to nest or fit into the other end of an adjacent filter 20'. The matched or complementary nesting profiles may be formed by folding during the manufacture of the air filter frame 30, by molding the frame material, which is generally cardboard, heavy paper or plastic, or by applying one or more separate strips of a separate material. The separate material may be heavy paper, cardboard, rigid plastic material or a flexible foam material.

FIG. 7D is an illustration of a top view of two separate disposable air filters 20, 20' having an alternative matched nesting element profiles 92, 92' on opposed ends 45, 50 that allow one end 45 of the air filter 20 to nest or fit in the other end 50 of an adjacent air filter 20', to reduce the gaps that may be present when the air filters 20, 20' are in adjacent or side-by-side relationship in the track of a filter bank. In this alternative embodiment, the male-female nesting gasket profile is much smaller and easier to manufacture. It is contemplated that the nesting gasket profile shown in FIG. 7D may be created by two parallel strips of material on one end defining a channel or female element 92' and a separate strip of material on the opposed end to create the male element 92.

FIG. 7E is an illustration of a top view of two separate disposable air filters 20, 20' having yet another alternative matched nesting element profiles 92, 92' on opposed ends 45, 50 that allow one end an air filter to nest or fit in the other end of an air filter to reduce the gaps that may be present when the air filters are in adjacent or side-by-side relationship in the track of a filter bank. In this alternative embodiment, the male-female nesting gasket profile is much sharper and may be pressed or formed into the material forming the ends of the air filter frame 30. Alternatively, the male-female nesting element profile shown in each of the FIGS. 7C-7E may be one that is prepared from a separate material that is applied and affixed using a glue or adhesive. The separate material may be heavy paper, cardboard, rigid plastic material or a flexible foam material.

Figure 8A:
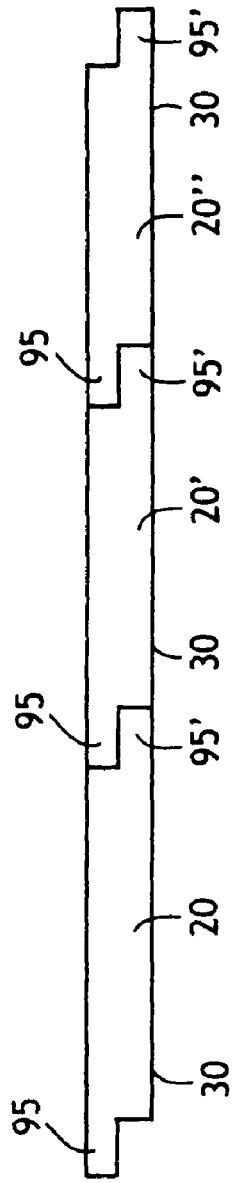
FIGS. 8A through 8C are illustrations of exemplary integral inter-filter gap fillers in the form of lap joints.
Figure 8B:
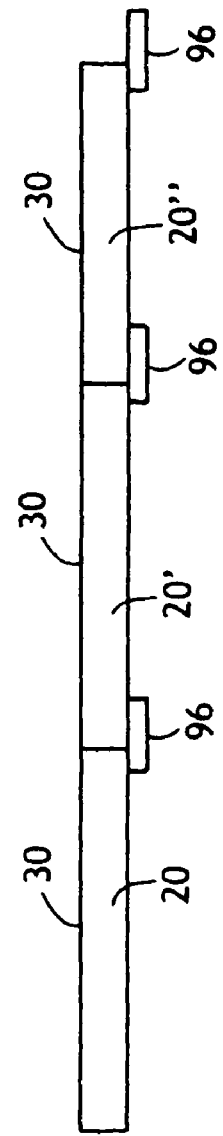
Figure 8C:
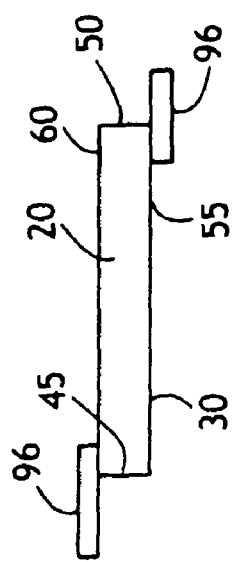

In another embodiment of the integral inter-filter gap filler, the gap filler 65 may be one or more (e.g., a plurality of) lap joints as generally illustrated in FIGS. 8A through 8C. Generally speaking, FIG. 8A is an illustration of a top view of three separate disposable air filters 20, 20', 20" having a substantially identical lap joint profiles 95, 95' that allow one end of an air filter frame 30 to fit in overlapping relationship with the other end of an adjacent air filter frame 30. The lap joint profiles 95, 95' are generally molded or formed into the air filter frame itself or may be made formed by folding a material such as, for example, paper, thin cardboard or plastic. Alternatively, the lap joints 95, 95' may be generated by cutting a separate material including paper, cardboard or plastic, or may be cut from a flexible material such as a foam material and then applying the separate material to the air filter frame 30.

FIG. 8B is an illustration of a top view of three separate disposable air filters 20, 20', 20" showing an alternative embodiment in which strip 96 of rigid material is present at only one end of an air filter frame 30 to create a lap joint profile that allows one end of the air filter frame 30 to overlap with the other end of an adjacent air filter frame 30. The strip of rigid material generating the lap joint profile is desirably molded or formed into the air filter frame itself or may be made formed by folding a material such as, for example, paper, thin cardboard or plastic. Alternatively, the strip 96 may be generated by cutting a separate material including paper, cardboard or plastic, or may be cut from a flexible material such as a foam material and then applying the separate material to the air filter frame 30. The separate material may be applied and affixed to the air filter frame 30 using a glue or adhesive.

FIG. 8C is an illustration of a top view of a disposable air filter 20 showing an alternative embodiment in which strip 96 of rigid material is present at alternating faces 55, 60 of each end 45, 50 of an air filter frame 30 to create a lap joint profile that allows each end 45, 50 of the air filter frame 30 to overlap with the other end 45, 50 of an adjacent air filter frame. The strip of rigid material generating the lap joint profile is desirably molded or formed into the air filter frame itself or may be made formed by folding a material such as, for example, paper, thin cardboard or plastic. Alternatively, the strip 96 may be generated by cutting a separate material including paper, cardboard or plastic or may be cut from a flexible material such as a foam material and then applying the separate material to the air filter frame 30. The separate material may be applied and affixed to the air filter frame 30 using a glue or adhesive.

Figure 8D:
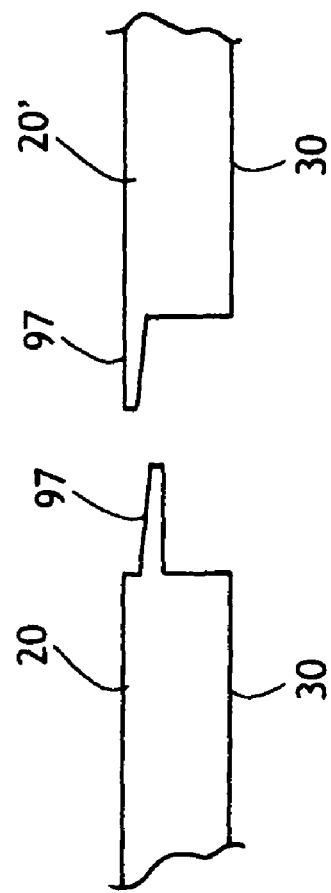
FIGS. 8D and 8E are illustrations of exemplary integral inter-filter gap fillers in the form of modified lap joints.
Figure 8E:
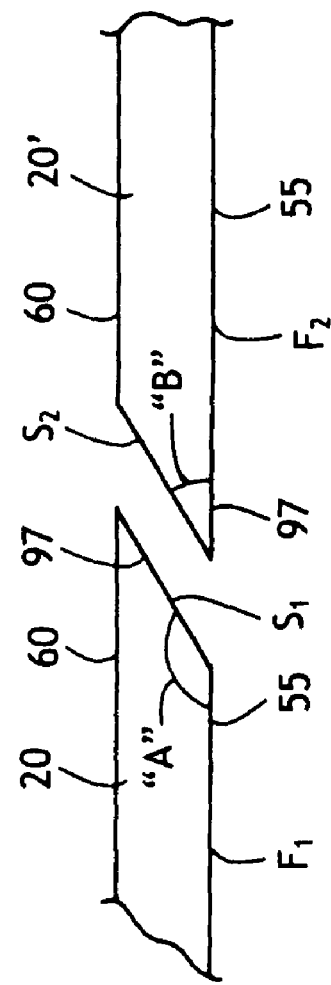

Other lap joints useable in the present invention include modified lap joints 97 as generally illustrated in FIG. 8D and FIG. 8E. Generally speaking, FIG. 8D is an illustration of a top view of two ends of two separate disposable air filters 20, 20' having a modified lap joint profile that allows one end of an air filter frame 30 to fit in overlapping relationship with the other end of an adjacent air filter frame 30.

In FIG. 8D, the two projections are offset slightly to form a modified lap joint 97. More particularly, the projection on air filter 20' of the illustration is substantially flush with the rear face 60 of the air filter frame 30, and the projection on air filter 20 of the illustration is slightly offset from the rear face 60 of the air filter frame 30 to create a profile that permits the projections to be brought together in overlapping relationship.

An alternative embodiment of a modified lap joint is illustrated in FIG. 8E which is a top view of two ends of two separate disposable air filters 20, 20' having a modified lap joint profile that allows one end of an air filter frame 30 to fit in generally overlapping relationship with the other end of an adjacent air filter frame 30. The modified lap joints 97 shown if FIGS. 8D and 8E may be molded or formed into the air filter frame itself or may be made formed by folding a material such as, for example, paper, thin cardboard or plastic. Alternatively, the modified lap joint 96 may be generated by cutting a separate material including paper, cardboard or plastic or may be formed from a flexible material such as a foam material and then applying the separate material to the air filter frame 30. The separate material may be applied and affixed to the air filter frame 30 using a glue or adhesive.

In FIG. 8E, each end of the air filter frame 30 is formed at a relatively radical angle in relation to the conventional ninety degree corner to form a modified lap joint 97. More particularly, the air filter 20 has an air filter frame 30 which defines a relatively obtuse angle with respect to the face "F1" of the air filter frame 30 and the side "S1" of the air filter frame. The air filter 20' has an air filter frame 30 which defines a relatively acute angle with respect to the face "F2" of the air filter frame 30 and the side "S2" of the air filter frame. Desirably, the obtuse angle is greater than 135 degrees and the acute angle is less than 45 degrees. More desirably, the obtuse angle is between about 140 degrees and 170 degrees and the acute angle is between about 40 degrees and about 10 degrees. However, obtuse and acute angles outside this range are also contemplated to be useable in the present invention.

Figure 9B:
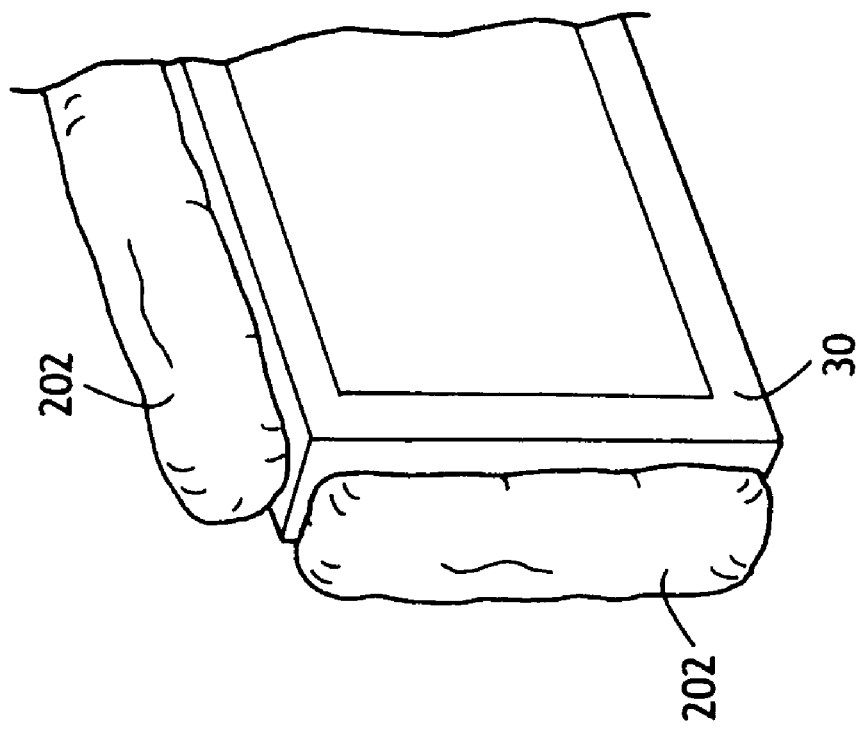
FIGS. 9A and 9B are illustrations of exemplary integral inter-filter gap fillers in the form of air-pressure responsive expandable elements.
Figure 9A:
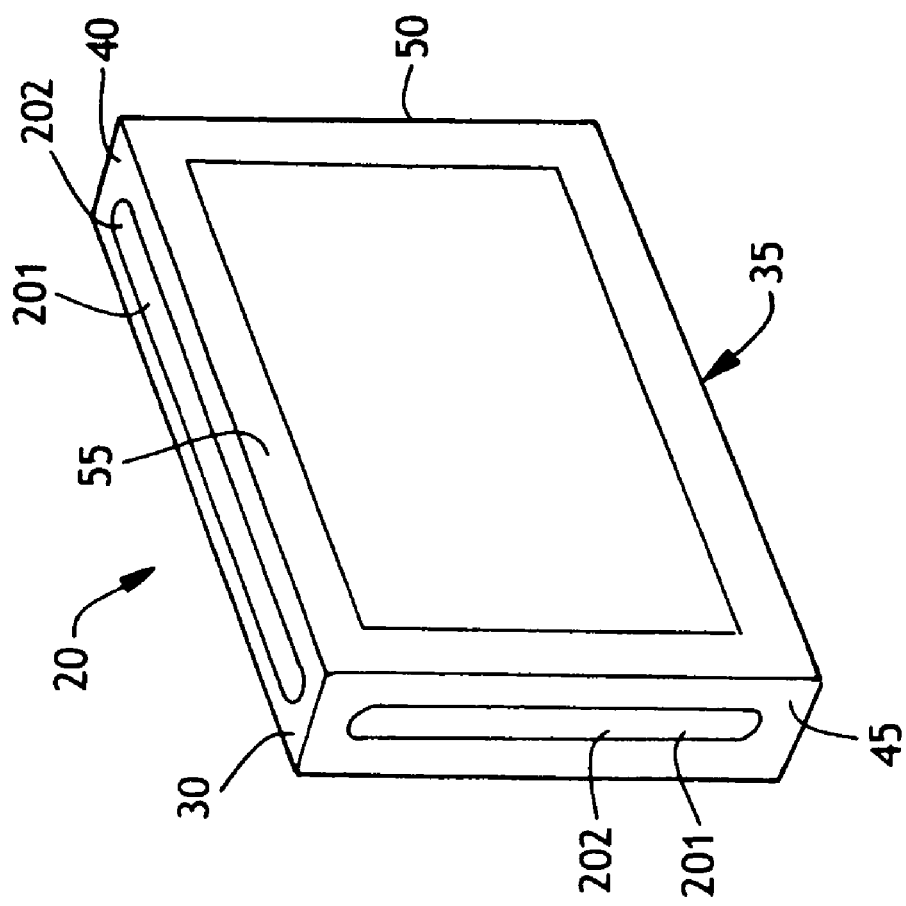

In another embodiment of the present invention, the gap filler may deployed or generated after the air filters are inserted filter bank. As is shown in FIG. 9A, one or more (e.g., a plurality of) of air-pressure responsive expandable elements 201 may be disposed on one or more sides 35, 40, 45, 50 of the air filter frame 30. Generally speaking, FIG. 9A is an illustration of a perspective view of a disposable air filter 20 showing a thin flexible film 202 extending substantially along at least one opposed sides 35, 40, 45, 50 of an air filter frame 30. The thin flexible film may be an elastic material that is adapted to expand under an applied air pressure or may be a non-elastic material present in a sufficient amount to "balloon" out against an adjacent air filter frame and/or filter track in response to an air pressure drop across the air filter. FIG. 9B shows shown the air pressure responsive elements in the deployed configuration, which will create a gasket with an adjacent filter having a similar element. One way to achieve this feature is to have the thin flexible film 202 extending substantially along at least one opposed side of an air filter frame. The film is desirably located along a groove or series of perforations (not shown) present in the filter frame 30 when the thin flexible film is attached. The grooves or perforations will allow a pressure drop across the air filter to inflate or expand the thin film to contact an adjacent air filter frame and/or filter track. The film may be a thin polyethylene film such as the type used to make "cling wrap" or may be a nominally thicker film such as the type used to make plastic trash bags or plastic grocery bags.

Figure 10:
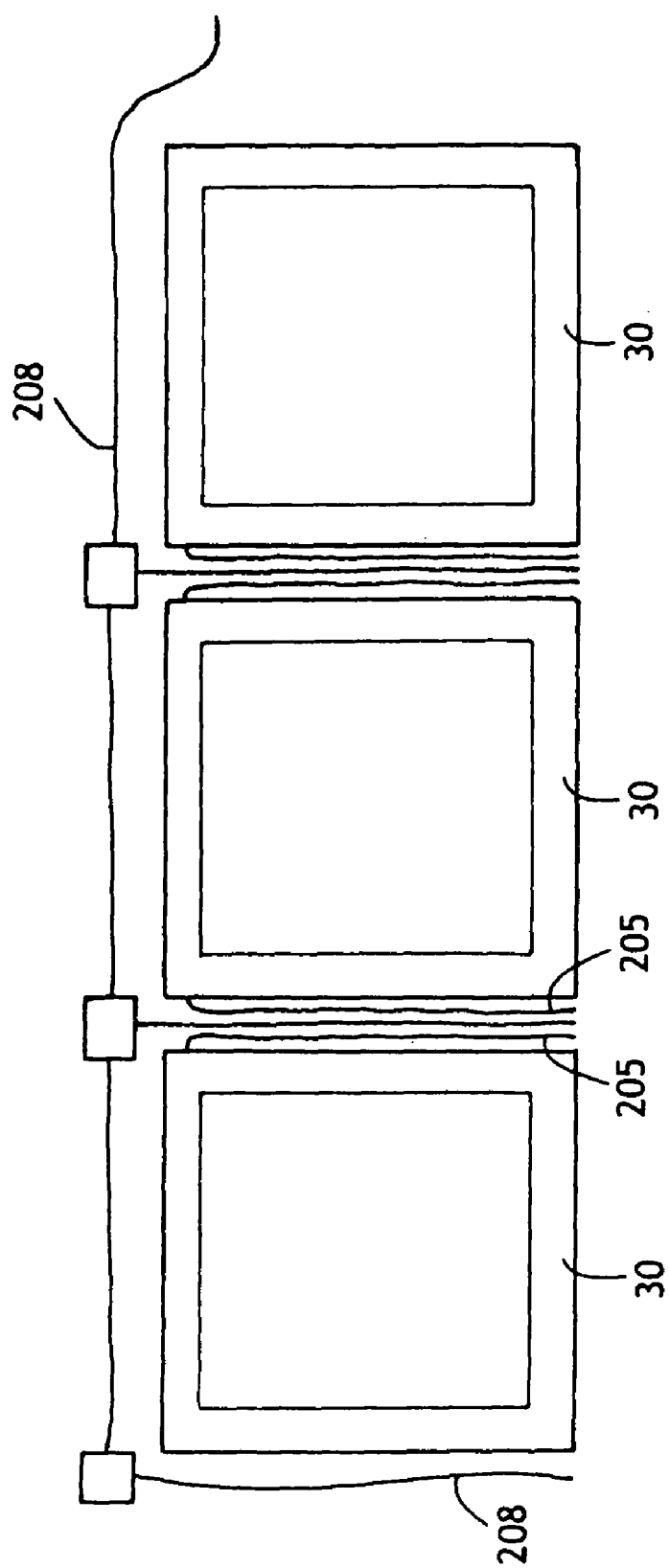
FIG. 10 shows an expansion bladder gap filler.

In another embodiment of the present invention shown in FIG. 10, the gap filler may be formed once the filters are inserted by using a chemical reaction a chemical reaction between two compounds to expand the seal and fill the void space between the edges of the filter and the walls of an enclosed channel (e.g., duct). The expandable bladder element 205 is on one or more sides of the air filter frame is comprised of a dual chambered system containing two compounds that when combined create an expandable foam that fills a bladder formed of an elastic material. A barrier device between the two chambers is ruptured to allow the two compounds to mix and trigger an instantaneous, or preferably time-delayed, chemical reaction that causes the combined material to expand in volume and fill void spaces between the edges of the filter and duct walls. One method to achieve rupture of the bladder is to use a "rip cord" mechanism 208 which will allow the barrier device rupture and trigger expansion of the bladder element 205 after the installer positions the filter in the duct. A continuous rip cord 208 connected to the barrier device of multiple installed filters may be used to enable the simultaneous triggering of multiple filters after they are positioned in a filtering system. Such a continuous rip cord could also maximize the ease and efficiency of removing of multiple used filters from a filtering system. As an alternative to the "rip cord" system, one of the components of the part system may be heat activated or pressure activated, by using a capsules which are sensitive to pressure or heat to cause the reaction needed to generate the gap filler.

With respect to other aspects of the present invention, the air filtration media may be any conventional air filtration material. Although paper filters and mixed media filter materials are frequently used, desirable air filtration media include non-woven fibrous web materials as well as laminates of these materials. Exemplary materials include, for example, U.S. Pat. No. 6,815,383 entitled "Filtration Medium with Enhanced Particle Holding Characteristics"; U.S. Pat. No. 6,624,100 entitled "Microfiber Nonwoven Web Laminates"; U.S. Pat. No. 6,322,604 entitled "Filtration Media and Article Incorporating the Same"; and U.S. Pat. No. 6,274,041 entitled "Integrated Filter Combining Physical Adsorption and Electrokinetic Adsorption", each hereby incorporated by reference. Essentially, any known air filtration media may be used in the air filter of the present invention. The air filtration may be a flat in nature or may be pleated within the air filter frame.

In yet another aspect of the invention, the integral inter-filter gap fillers may be adapted to connect adjacent air filters with sufficient structural strength in at least one direction so that the connection resists separation upon extraction of a plurality of connected air filters from the filter track of a filter bank. This connection may be formed by mechanical fastening systems or adhesive systems. The integral inter-filter gap filler may mechanically engage the gap filler or filter of an adjacent filter or the gap filler may be provided with an adhesive or have adhesive properties to help assure that the adjacent filters resist separation upon removal of the air filters from a filter track of a filter bank.

The present invention also encompasses an air filter system having at least two disposable air filters, (i.e., a plurality of disposable air filters) as generally described above. More particular, the air filter system utilizes a plurality of the air filter frames having an integral inter-filter gap filler disposed along substantially the entire length of at least one side of an opposed pair of the first or second sides of each air filter frame so that integral inter-filter gap filler reduces gaps between adjacent air filters. According to an aspect of the air filter system, the integral inter-filter gap fillers may be adapted to connect adjacent air filters with sufficient structural strength in at least one direction so that the connection resists separation upon extraction of a plurality of connected air filters from the filter track of a filter bank. Also contemplated by the present invention is a third or subsequent filter which may be installed in the filter bank in much the same way the second filter is installed.

The present invention further encompasses a method of installing disposable air-filters in the track of a filter bank of an air handling system utilizing the air filter system described above. The method includes at least the following steps: a) providing a first disposable air filter having an integral inter-filter gap filler; b) providing at least a second disposable air filter having an integral inter-filter gap filler; and c) inserting the first air filter in the track of a filter bank and then inserting at least a second air filter in the track of a filter bank and pushing the at least second air filter against the first or adjacent air filter so that the integral inter-filter gap filler reduces gaps between adjacent filters during air flow across the air filters.

The method of installing disposable air-filters in the track of a filter bank of an air handling system utilizing the air filter system described above may further include the feature that the integral inter-filter gap fillers are adapted to connect adjacent air filters with sufficient structural strength in at least one direction so that the connection resists separation upon extraction of a plurality of connected air filters from the filter track of a filter bank.

These and other features and advantages of the invention will become more apparent to one skilled in the art from the following description and claims when read in light of the accompanying drawings.

While particular embodiments of the present invention have been described herein; it will be apparent to those skilled in the art that alterations and modifications may be made to the described embodiments without departing from the scope of the appended claims.

What is claimed is:

1. A disposable air filter comprising:
air filtration media;
a substantially planar air filter frame providing three-dimensional support for the air filtration media, the air filter frame having an opposed pair of first sides, an opposed pair of second sides, two opposed faces, a width between the opposed faces; and
an integral inter-filter gap filler disposed along substantially the entire length of at least one side of an opposed pair of the first or second sides;
wherein the integral inter-filter gap filler is selected from a collapsible convex element; a flexible overlapping curved element; rigid lap joints, or a combination thereof;
and
wherein the integral inter-filter gap filler is adapted to reduce gaps between adjacent air filters which are installed in a filter track in a filter bank.

2. The disposable air filter of claim 1, wherein the integral inter-filter gap filler is a collapsible convex element and is formed from a corrugated material.

3. The disposable air filter of claim 2, wherein the corrugated material comprises alternating parallel grooves and ridges which extend parallel to the side of the air filter frame on which the integral gap filler is disposed.

4. The disposable air filter of claim 1, wherein the collapsible convex element, the flexible overlapping curved element, or the lap joint are formed from the same material as the air filter frame.

5. The disposable air filter of claim 1, wherein the collapsible convex element, the flexible overlapping curved element, or the lap joint are formed from a foam material.

6. The disposable air filter of claim 1, wherein the air filtration media is selected from paper, a nonwoven material or a combination thereof.

7. The disposable air filter of claim 1, wherein the integral inter-filter gap filler is disposed along substantially the entire length of both sides of an opposed pair of the first or second sides.

8. The disposable air filter of claim 1, wherein the integral inter-filter gap filler is a collapsible convex element.

9. An air filter system having at least two disposable air filters, the disposable air filters comprising:
air filtration media;
a plurality of substantially planar air filter frames providing three-dimensional support for the air filtration media, each air filter frame having an opposed pair of first sides, an opposed pair of second sides, two opposed faces, a width between the opposed faces; and
an integral inter-filter gap filler disposed along substantially the entire length of at least one side of an opposed pair of the first or second sides of each air filter frame;
wherein the integral inter-filter gap filler is selected from a collapsible convex element; a flexible overlapping curved element; rigid lap joints; an air-pressure responsive expandable element which is deployed after the filter is disposed in a filter bank; or a combination thereof;
and
wherein the integral inter-filter gap filler reduces gaps between adjacent air filters.

10. The air filter system of claim 9, wherein the integral inter-filter gap filler is a collapsible convex element and is formed from a corrugated material.

11. The air filter system of claim 10, wherein the corrugated material comprises alternating parallel grooves and ridges which extend parallel to the side of the air filter frame on which the integral gap filler is disposed.

12. The air filter system of claim 9, wherein the collapsible convex element, the flexible overlapping curved element, the nesting elements, or the lap joint are formed from the same material as the air filter frame.

13. The air filter system of claim 9, wherein the air filtration media is selected from paper, a nonwoven material or a combination thereof.

14. The air filter system of claim 9, wherein the integral inter-filter gap filler is disposed along substantially the entire length of both sides of an opposed pair of the first or second sides.

15. The air filter system of claim 9, wherein the integral inter-filter gap filler is selected from a collapsible convex element, nesting elements, an air-pressure responsive expandable element or a combination thereof.

16. An air filter system having at least two disposable air filters, the disposable air filters comprising:
   air filtration media;
   a plurality of substantially planar air filter frames providing three-dimensional support for the air filtration media, each air filter frame having an opposed pair of first sides, an opposed pair of second sides, two opposed faces, a width between the opposed faces; and
   an integral inter-filter gap filler disposed along substantially the entire length of at least one side of an opposed pair of the first or second sides of each air filter frame;
   wherein the integral inter-filter gap filler is selected from a collapsible convex element; a flexible overlapping curved element; nesting elements where a first element has a first female shape component that is formed into a surface on one side of the air filter frame, the surface being perpendicular to the two opposed faces, and a second nesting element that has a complementary second male shape on an adjacent air filter frame that is adapted to fit into the first female shape; rigid lap joints; an air-pressure responsive expandable element which is deployed after the filter is disposed in a filter bank; or a combination thereof;
   wherein the integral inter-filter cap filler reduces gaps between adjacent air filters;
   and
   wherein the collapsible convex element, the flexible overlapping curved element; the nesting elements, or the lap joint are formed from a foam material.

* * * * *